United States Patent Office 2,928,182
Patented Mar. 15, 1960

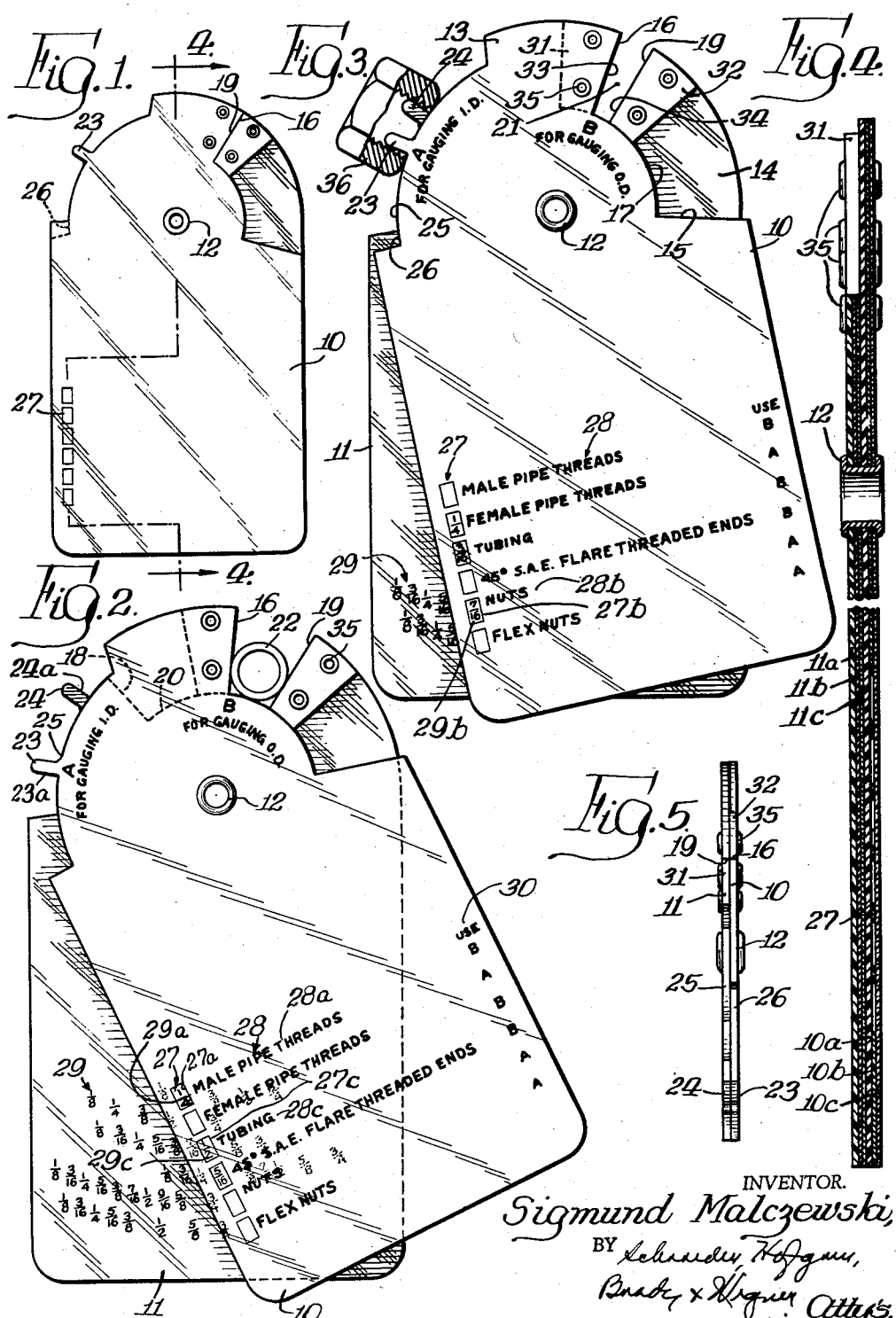

2,928,182

GAUGE

Sigmund Malczewski, Chicago, Ill., assignor to The Imperial Brass Manufacturing Company, a corporation of Illinois Application November 7, 1957, Serial No. 695,062

5 Claims. (Cl. 33—178)

This invention relates to a gauge and in particular to a gauge for use with tubular ducts and fittings used with such tubular ducts.

It is often desirable to determine the nominal designation of standard tubing and pipes and of the fittings, such as nuts, sleeves, bodies, etc. used therewith. While conventional calipers may be employed to determine the internal or external dimensions of such elements, these instruments are not operable with high degrees of facility and, thus, are not properly usable for rapid determinations such as in handling stock of such elements. Further, such instruments are conventionally calibrated in units of measurement and do not readily correlate such units with the nominal designations of such elements. Thus, a person using such an instrument would be required to obtain additional information, by such means as reference to a table, to convert the unit of measurement into the nominal designation.

The purpose of this invention is to provide a new and improved means for gauging tubular ducts and fittings used with such tubular ducts.

Another object is to provide such a gauge means having indicia means associated therewith automatically converting a linear measurement into a nominal designation for identifying such ducts and fittings.

A further object is to provide such a gauge means having means for measuring the diameter of the element being gauged and indicia means arranged in a novel manner to provide increased accuracy in the use thereof, said indicia means having a multiplied effect relative to the means for measuring the diameter.

Still another object is to provide such a gauge means comprising a pair of gauge plates pivotable about a common axis and having cooperating means for measuring the outside diameter of a duct or fitting element, comprising a radially extending edge on each of said plates, and means for measuring the inside diameter of such elements, comprising a radially projecting finger of each of said plates.

Yet another object is to provide such a gauge means having associated means for limiting the mutually pivotal movement of the plates.

A yet further object is to provide such means wherein the movement limiting means comprises a pair of blocks reinforcing respectively each of the plates adjacent the edges defining the means for measuring the outside diameter.

Other features and advantages of this invention will be apparent from the following description taken in connection with the accompanying drawings wherein:

Fig. 1 is a face view of a gauge embodying the invention;

Fig. 2 is an enlarged face view showing the use thereof in measuring the outside diameter of a tubular element;

Fig. 3 is an enlarged face view showing the use thereof in measuring the inside diameter of a fitting element;

Fig. 4 is an enlarged longitudinal section taken approximately along the line 4—4 of Fig. 1; and Fig. 5 is an enlarged end view of the gauge looking from the end thereof provided with the measuring means.

In the exemplary embodiment of the invention as disclosed in the drawings, a means for gauging tubular ducts and fittings used with such tubular ducts is shown to comprise a pair of gauge members pivotally connected and having at one end thereof means for selectively measuring the inside and outside diameters of fitting elements and the outside diameter of tubular ducts. At the other end of the gauge members are provided suitable indicia means cooperating to indicate desired information as nominal designations of the tubular ducts and fitting elements.

More specifically, the gauge comprises a first gauge member 10 and a second gauge member 11, which members may comprise flat plates retained in facially juxtaposed relationship by suitable securing means 12 illustratively shown as a rivet. The gauge members are carried by rivet 12 for pivotal movement about the respective axes of each gauge member, which axes are thus coaxially aligned by the rivet means. Gauge members 10 and 11 may be formed of any suitable rigid material. In the illustrated embodiment, gauge member 10 comprises a transparent plastic sheet 10a having a suitable opaque backing such as coating 10b. Coating 10b may be protected by a varnish coating 10c. Gauge member 11 comprises a similar construction of plastic sheet 11a, opaque backing 11b, and protective coating 11c.

One end 13 of gauge member 10 and one end 14 of gauge member 11 are generally arcuate, and ends 13 and 14 are arranged to provide cooperating means for measuring the internal and external diameters of the elements to be gauged. Thus, end 13 of gauge 10 is provided with a radially inwardly extending notch 15 having a radially extending edge 16 and an arcuate inner end 17. End 14 of gauge member 11 is provided with an inwardly extending notch 18 having a radially extending edge 19 and an arcuate inner end 20. When gauge members 10 and 11 are in coextensive relationship, as seen in Fig. 1, edge 16 is adjacent and aligned with edge 19.

Pivoting of gauge member 10 in a counterclockwise direction relative to gauge member 11 (as seen in Fig. 3) effects a spacing of edge 16 circumferentially from edge 19 to form a space 21 therebetween. In gauging the external diameter of an element, such as a tube 22, the element is inserted into space 21 to extend axially perpendicular to the central planes of gauge members 10 and 11 and in abutment with inner ends 17 and 20 of notches 15 and 18. Gauge member 10 is then urged in a clockwise direction so as to effect abutment of edges 16 and 19 with opposite portions of tubular element 22 defined by the opposite ends of a chord adjacent and parallel to the diameter of the element 22 which is perpendicular to a radius drawn from the axis of rivet 12 through the center of the element 22. As the length of the chord for each size element 22 is directly related to the actual external diameter of each element, this positioning of the edges 16 and 19 effects a measurement determination of the actual external diameter.

For effecting internal diameter determinations, gauge ends 13 and 14 are each further provided with radially outwardly projecting fingers 23 and 24 respectively. In the illustrated embodiment, the fingers are formed by cutting away a circumferential portion of ends 13 and 14 and the radially inner or bottom edge of the cutaway portion defines circumferentially extending shoulders 25 and 26 of ends 13 and 14 respectively. Each of fingers 23 and 24 is preferably narrow, and the counterclockwise edge 23a of finger 23 and the clockwise edge 24a of finger 24 intersect shoulder edges 25 and 26 respectively at right angles thereto. To effect an internal diameter determination, fingers 23 and 24 are inserted into the element to be gauged, such as a nut 36, with the end of the element abutting shoulders 25 and 26. Rotation of gauge 10 in a counterclockwise direction relative to gauge member 11 is effected until the fingers engage diametrically opposite portions of the interior of the element 36.

To convert automatically the actual diameter measurements determined by use of the gauge members as discussed above into nominal size determinations, the gauge members are further provided with suitable indicia means. Thus as best seen in Figs. 2 and 3, first gauge member 10 is provided with a plurality of apertures 27 in the opaque sheet 10c thereof, each of which apertures has a suitable legend 28 associated therewith. The second gauge member 11 is provided with a corresponding plurality of groups of indicating symbols 29, a different group being arranged for cooperating with each of the different apertures 27.

More specifically, legends 28 may represent different tubular duct elements and fittings used with such elements, e.g. "Male Pipe Threads," "Female Pipe Threads," "Tubing," "Flare Threaded Ends," "Nuts," and "Flex Nuts." Symbols 29 may be the corresponding nominal size designations of the elements represented by the legends and thus would constitute series of fractional numerals.

As certain of the gauge determinations relate to external diameter determinations and others relate to internal diameter determinations, means may be provided for indicating which of the legends 28 and associated symbols 29 relate to the specific determination to be made. For this purpose, a second legend 30 is provided on gauge member 10. The means defining the external diameter measuring structure including edges 16 and 19 is designated "B," and the means for measuring the internal diameter including fingers 23 and 24 is designated "A," and corresponding indications of the measuring means is represented in legend 30 by these letters.

To permit increased accuracy in the determinations made with gauge members 10 and 11, the indicia means including apertures 27 and associated symbols 29 are disposed from pivot means 12 at a distance substantially greater than the spacing from pivot means 12 of inner ends 17 and 20 of notches 14 and 15 and shoulders 25 and 26 associated with fingers 23 and 24 respectively. Thus, a substantial movement of apertures 27 relative to gauge member 11 is effected for a given angular displacement between the gauge members, allowing for increased spacing between the individual symbols 29 and allowing use of relatively large symbols, thus permitting increased facility in reading and accuracy in the use of the indicia means.

To align the gauge members 10 and 11 in automatic coextensive relationship when the device is not in use, a pair of blocks 31 and 32 are secured to gauge members 10 and 11 respectively at edges 16 and 19 thereof. Confronting edges 33 and 34 of blocks 31 and 32 respectively register with edges 16 and 19 respectively. Thus, when gauge member 10 is pivoted about means 12 in a clockwise direction relative to gauge member 11, the gauge members are limited in this mutual movement by abutment of edge 33 of block 31 with edge 19 of gauge member 11 and edge 34 of block 32 with edge 16 of edge member 11. Blocks 31 and 32 may be secured to the respective gauge members by suitable means such as rivets 35 and comprise additionally means for reinforcing edges 16 and 19.

In using the device for measuring the external diameter of an element such as a fitting 22 having a male pipe thread, the thread portion of the fitting is inserted into space 21, as discussed above, with the axis thereof perpendicular to the central planes of gauge members 10 and 11, and peripherally abutting inner ends 17 and 20 of the notches 15 and 18, respectively. When gauge member 10 is pivoted clockwise until edges 16 and 19 abut opposed portions of the fitting thread, an aperture 27a associated with a legend 28a, "Male Pipe Threads," is disposed in registry with a numeral 29a, e.g., "¼," of symbols 29. The gauge, thus, indicates that the fitting thread is nominally a ¼" pipe thread. Thus, although the external diameter thereof is not equal in inches to the nominal designation thereof, the length measurement of the diameter is automatically converted by the gauge into the corresponding correct nominal designation.

The gauge provides another advantage in making determinations of tubing sizes. Symbols 29c, associated with opening 27c and the scale marking 28c, "Tubing," are preferably limited only to the actual different size designations of such tubing. Thus, no extraneous marks or indications are present to confuse the determination, such as the graduated scale markings on the ordinary measuring devices. Resultingly, rapid and accurate tubing size designations may be effected with the gauge.

Alternatively, to determine the nominal designation of a female element, such as nut 36, the element is moved longitudinally over fingers 23 and 24, as seen in Fig. 3, until the element abuts shoulders 25 and 26 of the gauge members. The gauge members are relatively pivoted until edges 23a and 24a of the fingers engage diametrically opposed portions of the interior of the element. An aperture 27b associated with a legend 28b, "Nuts," is disclosed in registry with a corresponding symbol 29b, "7/16." Thus, the gauge indicates that nut 36 is a nominal 7/16" nut. Again, the fact that the actual internal diameter is not precisely 7/16", is taken into account, and the actual determination is converted into the proper nominal designation thereof.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Means for gauging tubular ducts and fittings used with such tubular ducts, comprising: a first gauge member having an axis of rotation, a portion defining a radially extending edge, a radially projecting finger, shoulders on said first gauge member extending laterally from said edge and finger respectively for abutment with the duct or fitting engaged selectively by said edge and finger to position said duct or fitting at the proper radial distance from said axis of rotation during a gauging operation, and indicia means spaced from the axis at a distance greater than the spacing of said edge and finger from said axis; a second gauge member having an axis of rotation coincident with the axis of rotation of the first gauge member, a portion defining a radially extending edge for cooperation with the edge of the first gauge member to engage at opposed portions the outer wall of a tubular duct or fitting inserted therebetween, a radially projecting finger for cooperaion with the finger of the first gauge member to engage at diametrically opposed portions the inner wall of a tubular duct or fitting into which said fingers are extended, shoulders on said second gauge member extending laterally from said edge and finger of the second gauge member respectively for abutment with the duct or fitting engaged selectively by said edge and finger to position said duct or fitting at the proper radial distance from said axis of rotation during a gauging operation, and indicia means spaced from the axis of said second member at a greater distance than the spacing of said edge and finger thereof from the axis thereof for cooperation with the indicia means of the first gauge member to indicate desired information relative to such tubular duct or fitting engaged selectively by said edges and said fingers; and means for juxtaposing said gauge members with their respective axes aligned for mutually parallel pivotal movement about said axes to space adjustably the respective edges of said members and the respective fingers of said members.

2. Means for gauging tubular ducts and fittings used with such tubular ducts, comprising: a first gauge member having an axis of rotation, a portion defining a radially extending edge, a radially projecting finger, shoulders on said first gauge member concentric of said axis of rotation and extending laterally from said edge and finger respectively for abutment with the duct or fitting engaged selectively by said edge and finger to position said duct or fitting at the proper radial distance from said axis of rotation during a gauging operation, and indicia means thereon; and a second gauge member having an axis of rotation coincident with the axis of rotation of said first gauge member, a portion defining a radially extending edge for cooperation with the edge of the first gauge member to engage at opposed portions the outer wall of a tubular duct or fitting inserted therebetween, a radially projecting finger for cooperation with the finger of the first gauge member to engage at diametrically opposed portions the inner wall of a tubular duct or fitting into which said finger is extended, shoulders on said second gauge member concentric of said axes of rotation and extending laterally from said edge and finger of said second gauge member respectively for abutment with the duct or fitting engaged selectively by said edge and finger of the second gauge member to position said duct or fitting at the proper radial distance from said axes of rotation during a gauging operation, and indicia means thereon for cooperation with the indicia means of the first gauge member to indicate desired information relative to such tubular duct or fitting engaged selectively by said edges and said fingers.

3. Means for gauging tubular ducts and fittings for use with such tubular ducts, comprising: a first gauge plate having an axis of rotation perpendicular to the flat extent thereof, a portion defining a radially extending edge, a radially projecting finger, and indicia means thereon; a second gauge plate having an axis of rotation perpendicular to the flat extent thereof, a portion defining a radially extending edge for cooperation with the edge of the first plate to engage at opposed portions the outer wall of a tubular duct or fitting inserted therebetween, a radially projecting finger for cooperation with the finger of the first plate to engage at diametrically opposed portions the inner wall of a tubular duct or fitting into which said finger is extended, and indicia means thereon for cooperation with the indicia means of the first gauge plate to indicate desired information relative to such tubular duct or fitting engaged selectively by said edges and said fingers; means for juxtaposing said gauge plates with their respective axes aligned for mutually parallel pivotal movement about said axes to space adjustably the respective edges of said members and the respective fingers of said members; and means for limiting the mutual pivotal movement of said gauge plates comprising a reinforcing block carried by one gauge plate to extend through the plane of the flat extent of the other gauge plate and having an edge, the edge of said block and the edge of said one gauge plate being superimposed.

4. Means for gauging tubular ducts and fittings as set forth in claim 3 wherein said means for limiting the mutual pivotal movement of said gauge plates comprises a pair of reinforcing blocks, one on each of said gauge plates.

5. Means for gauging tubular ducts and fittings for use with such tubular ducts, comprising: a first gauge plate having an axis of rotation, a first arcuate end portion having a notch provided with a radially extending edge, a second arcuate end portion having a radially projecting finger, and indicia means spaced from the axis at a distance greater than the spacing from said axis of the radially innermost portion of said edge and finger; a second gauge plate having an axis of rotation, a first arcuate end portion having a notch provided with a radially extending edge for cooperation with the edge of the first plate to engage at opposed portions a tubular duct or fitting inserted therebetween, a second arcuate end portion having a radially projecting finger for cooperation with the finger of the first plate to engage at diametrically opposed portions the inner wall of a tubular duct or fitting into which said finger may be extended, and indicia means spaced from the axis of the second plate at a distance greater than the spacing from the axis thereof of the radially innermost portion of said edge and finger thereof for cooperation with the indicia means of the first plate to indicate desired information relative to such tubular duct or fitting engaged selectively by said edges and said fingers; and means for juxtaposing said gauge members with their respective axes aligned for mutually parallel pivotal movement about said axes to space adjustably the respective edges of said members and the respective fingers of said members.

References Cited in the file of this patent

UNITED STATES PATENTS

| | | |
|---|---|---|
| 901,653 | Shapleigh | Oct. 20, 1908 |
| 1,285,175 | Hinkle | Nov. 19, 1918 |
| 1,345,071 | Butler | June 29, 1920 |
| 2,362,907 | Levin | Nov. 14, 1944 |
| 2,603,872 | Jones | July 22, 1952 |

OTHER REFERENCES

Publ. "Popular Mechanics," October 1943, page 128.